United States Patent
Gustafsson et al.

(10) Patent No.: US 6,506,303 B1
(45) Date of Patent: Jan. 14, 2003

(54) LIQUID FILTER WITH A REPLACEABLE FILTER ELEMENT

(75) Inventors: Krister Gustafsson, Stockholm (SE); Fredrik Öhrnell, Nacka (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 09/701,846

(22) PCT Filed: Jun. 2, 1999

(86) PCT No.: PCT/SE99/00952
§ 371 (c)(1),
(2), (4) Date: Dec. 4, 2000

(87) PCT Pub. No.: WO99/65589
PCT Pub. Date: Dec. 23, 1999

(30) Foreign Application Priority Data

Jun. 4, 1998 (SE) .............................................. 9801980

(51) Int. Cl.⁷ ............................................. B01D 35/16
(52) U.S. Cl. ........................ 210/248; 210/438; 210/450; 210/454
(58) Field of Search ................................ 210/248, 438, 210/450, 454, 457

(56) References Cited

U.S. PATENT DOCUMENTS 5,476,585 A * 12/1995 Mills .......................... 210/232
5,516,425 A   5/1996 Brieden ....................... 210/232

FOREIGN PATENT DOCUMENTS

DE    4330840 C1 *  2/1995
EP    0612549       8/1994

* cited by examiner

Primary Examiner—Matthew O. Savage
(74) Attorney, Agent, or Firm—Ostrolenk, Faber, Gerb & Soffen, LLP

(57) ABSTRACT

Liquid filter arrangement with interchangeable filter element and including a pot-like filter housing in which the filter element is disassemblably inserted between a liquid inlet to the chamber and an outlet situated below, in the lower section of the filter housing, for filtered liquid from the chamber. In the liquid chamber is arranged a central tube about which is arranged the filter element which is provided at the bottom with an annular end piece sealingly surrounding the central tube, and is provided upwards with an end disc by which the filter element is fastened to a lid fastened sealingly in the upper section of the filter housing. When the filter element is in its fitted position, the end piece blocks the inlet to a draining duct in the central tube, which duct leads to a draining outlet from the chamber. The inlet to the draining duct is so placed relative to the end piece and the lid that as the filter element is taken out of the chamber the duct inlet is freed and opened before the sealing effect between the lid and the filter housing ceases.

20 Claims, 2 Drawing Sheets

LIQUID FILTER WITH A REPLACEABLE FILTER ELEMENT

TECHNICAL FIELD

The present invention relates to a liquid filter arrangement in accordance with the preamble to patent claim 1.

STATE OF THE ART

The purpose of a liquid filter is to separate contaminating particles from a liquid which is to be used in one way or another in equipment to which the liquid is fed and whose operation may be disturbed or prevented if such particles accompanying the liquid enter the equipment concerned. The liquid may for example be fuel for combustion in an engine, hydraulic oil for operating or driving hydraulic equipment, or liquid intended to be finely divided by means of a spray nozzle.

In cases where the liquid filter is a fuel filter for a gasoline engine, it is usually incorporated between a fuel pump and the engine's carburetor/injection arrangement. In cases where the engine is a diesel engine, the fuel filter is usually incorporated between a feed pump and the engine's injection pump.

The interchangeable filter insert (filter cartridge) in such a fuel filter may for example consist of a prismatic or circularly cylindrical stack of felt pads or filter paper discs. In cases where a paper filter insert is used, it may for example consist of a special water-repellent paper filter element folded in a spiral configuration in order to form pockets, pores or cells resulting in maximum filtration surface for a given area/volume.

The efficiency of such an initially very effective filter insert will nevertheless inevitably decrease gradually as the particle-intercepting pockets/pores/cells become increasingly choked with separated particles. The filter insert has therefore eventually to be replaced by a completely new filter insert.

On the occasion of such changing of a filter insert or a filter element in a fuel filter, it is difficult to avoid fuel spillage if the filter housing is full of fuel which is under a certain positive pressure. In such cases, fuel will escape from the filter housing when the lid of the housing is unscrewed, thereby reducing the pressure in the fuel filter. Even if quite a large proportion of the fuel in the filter housing escapes when the housing lid is removed, a certain quantity of fuel will still remain in the filter housing when the old filter insert (filter element) has been-removed from the filter housing.

The insertion of a new filter element into the filter housing does require, however, the filter housing to be at least nearly empty of fuel, since there would otherwise be risk that fuel remaining in the housing might be forced out of the filter housing by the insertion of the new filter element into the housing.

OBJECT OF THE INVENTION

The object of the present invention is to avoid the aforesaid fuel spillage problem by providing a new type of liquid filter arrangement which prevents fuel being forced out of the filter housing when the housing lid is removed, and which eliminates any risk of fuel being forced out of the filter housing by the insertion of a new filter element into the housing.

DESCRIPTION OF THE INVENTION

The aforesaid object is achieved, in a liquid filter arrangement describe below.

Primary distinguishing aspects of the invention are therefore that the liquid chamber incorporates a central tube which is concentric with the central longitudinal axis of the filter housing and which has its lower end fastened in the central bottom portion of the filter housing, and that there is arranged about the central tube a sleeve-like filter element which is provided at the bottom with an annular end piece sealingly surrounding the central tube and is provided at the top with an end disc by which the filter element is connected to a lid fastened sealingly into the upper part of the filter housing. When the filter element is in its fitted position, the end piece blocks the inlet to a draining duct in the central tube, which duct leads to a draining outlet from the chamber. The inlet to the draining duct is so positioned relative to the end piece and the lid that as the filter element is taken out of the chamber the duct inlet is freed and opened before the sealing effect between the lid and the filter housing ceases. The seals between the lid and the filter housing are thus arranged at a level which is higher than the highest liquid level in the chamber when the sealing effect ceases.

The aforesaid fuel spillage problem is therefore avoided on the occasion of filter element changing because of the presence of the draining duct in the lower part of the central tube, which duct is opened so that residual fuel in the liquid chamber can escape from the chamber before the pressure-maintaining sealing effect between the lid and the filter housing ceases. The liquid thus tapped from the chamber via the draining duct is advantageously led from the draining outlet back to the ordinary liquid tank during the changing of the filter element.

The end piece of the filter element preferably also includes not only a sleeve portion which sealingly surrounds the central tube and which has a lower end adjacent to the bottom of the liquid chamber, but also a disc-shaped flange portion which protrudes radially, perpendicular to the central tube, from the upper end of the sleeve portion. The end disc of the filter element may advantageously be a planar circular disc situated in an imaginary plane perpendicular to the central tube. The end disc is preferably connected to the lid of the filter housing by a snap connection which keeps the filter element stationary relative to the lid.

The filter cartridge (filter insert) consisting of the filter element with associated end piece and end disc can therefore be disassembled as a single unit from the liquid chamber by removing the lid from the filter housing, which involves the filter element snap-fastened into the lid via the end disc accompanying the lid upwards when the latter is released and disassembled from the filter housing.

Tightness between the end piece and the outside of the central tube may with advantage be provided by a pair of annular seals, e.g. O-rings, acting between the outside of the central tube and the inside of the sleeve portion surrounding the end piece. These two axially separated annular seals are preferably placed in a pair of parallel circumferential grooves in the inside of the sleeve portion. When the filter element is in its fitted position whereby the lower end of the sleeve portion is adjacent to the bottom of the liquid chamber, the two annular seals are situated on axially opposite sides of the orifice to the inlet of the draining duct. In alternative embodiments of the invention, tightness may be provided by a seal specially designed for the purpose, instead of the two O-rings. In other alternative embodiments it is also possible for these seals to be fitted to the central tube instead of to the sleeve portion.

The mutually cooperating sealing surfaces of the lid and the upper end section of the filter housing may advantageously include the lid having a cylindrical outer shell surface that forms a sealing surface and cooperates with a corresponding annular sealing surface on an internal portion of the upper end section of the filter housing. In such cases the lid's shell surface acting as sealing surface is advantageously provided with a circumferential seal. For example, that seal may be an O-ring provided in a circumferential groove in the shell surface to bear upon the sealing surface on the upper end section of the filter housing.

The lid is preferably fastened by screwing into the upper section of the filter housing, which entails the lid and the upper end section of the filter housing being provided with mutually cooperating and engaging threaded portions according to claim 10.

When filter element changing is to take place, the lid can therefore be screwed upwards out of the upper end section of the filter housing, which means that the lid is accompanied by the filter element fastened into it via the end disc and that the filter element's seals situated in the end piece free and open the draining channel inlet in the central tube before the seal acting between the sealing surfaces of the lid and of the upper end section of the filter housing moves so far that their sealing effect ceases. To ensure this two-stage deactivation of the respective seals of the draining channel inlet and the lid, the liquid filter arrangement may have the axial distance (h) between the seal, which is situated on the sleeve portion of the end piece and which is close to the bottom of the liquid chamber, and the orifice to the inlet of the draining duct be less than the distance H between the seal on the lid shell surface and the axially outermost edge of the corresponding sealing surface on the upper end of the filter housing, so that the drainage channel is opened for drainage before the lid and filter move free of the filter housing.

It may quite generally be observed that a liquid filter arrangement according to the present invention affords a number of advantages relative to known liquid filter arrangements. For example, liquid spillage (e.g. fuel spillage) can be avoided when changing filter elements, since necessary draining of residual liquid (e.g. fuel) in the filter housing is assured before the filter element change can take place. Further advantages of an arrangement according to the invention include the fact that the draining duct can be accommodated in the central tube, which is in practice brought about at the stage of casting the central tube in cases where the latter is made by casting. The constructional configuration of the liquid filter arrangement according to the invention makes it easy and inexpensive to manufacture and means that satisfactory draining function can be assured, inter alia because the arrangement consists of a small number of constituent elements which need not be made with particularly high precision of manufacture, partly because necessary seals in the liquid filter arrangement can be provided by separate sealing elements such as O-rings.

BRIEF DESCRIPTION OF THE DRAWINGS

A liquid filter arrangement according to the invention will now be described in more detail and clarified further with reference to an embodiment of the arrangement depicted in the attached sheets of drawings, as follows.

DESCRIPTION OF AN EMBODIMENT

Figure 1:
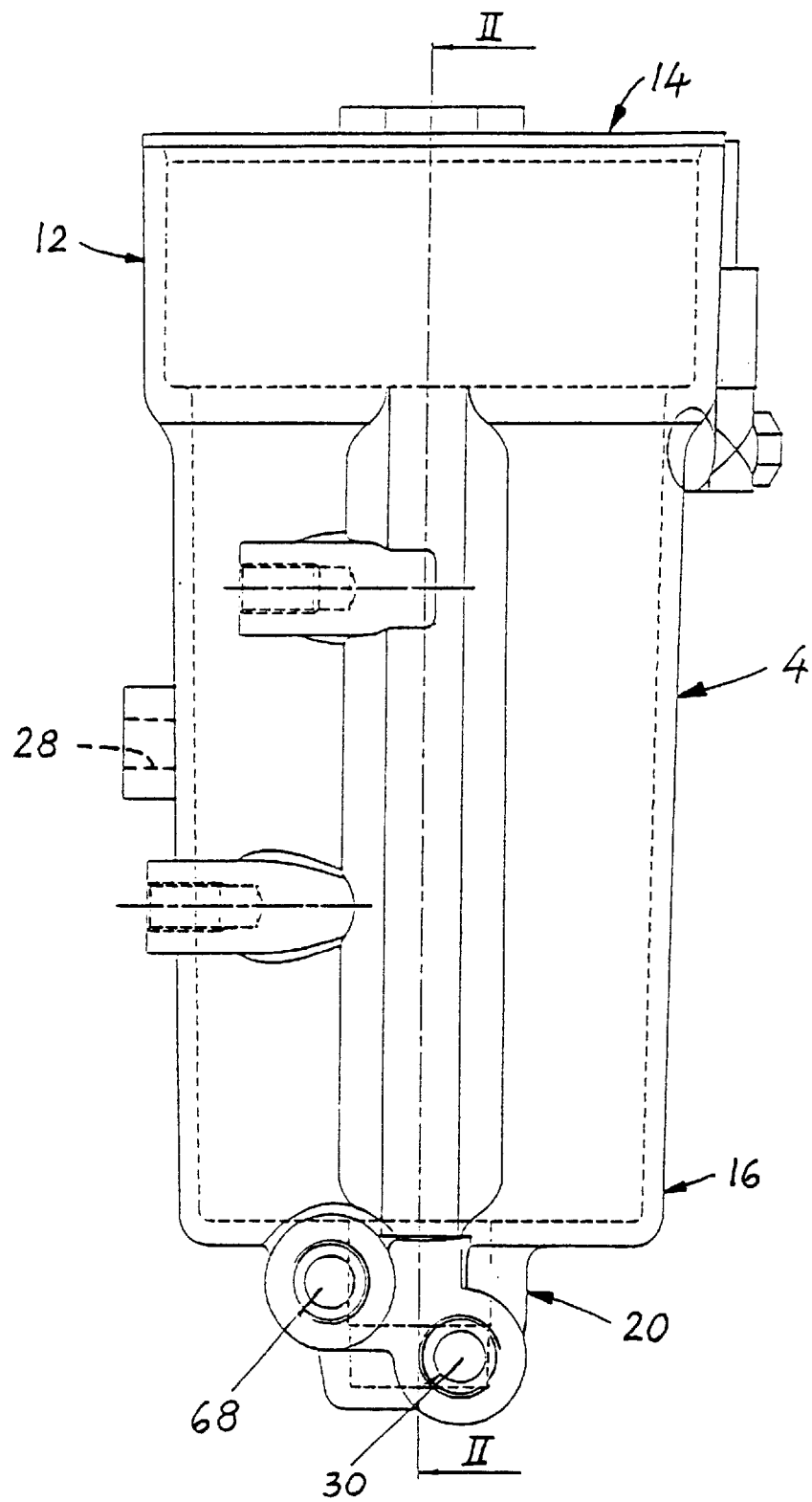
FIG. 1 depicts a side view of a vertically arranged liquid filter arrangement.

The invention will now be exemplified with reference to a preferred embodiment, depicted in the attached drawings, of a liquid filter arrangement 2 designed in accordance with the principles of the invention. The depicted liquid filter arrangement 2 described below is primarily intended to serve as a fuel filter arrangement, so the liquid filtered in this case may be any type of fuel, such as fuel for a combustion engine, or specifically a diesel fuel for a diesel engine.

The filter arrangement 2 is thus in this case a fuel filter arrangement and includes a pot-like filter housing 4 which is intended to be mounted with its central longitudinal axis A directed vertically. The filter housing 4, which in the present case tapers slightly downwards, both outside and inside, contains a fuel chamber 6 delineated outwards by the inside 8 of the wall 10 of the filter housing 4. The fuel chamber 6 is delineated upwards in the upper section 12 of the housing 4 by a lid 14 fastened sealingly therein. Downwards, in the lower section 16 of the filter housing 4, the fuel chamber 6 is delineated by the bottom wall 18 and recessed central bottom portion 20 of the housing 4. The fuel chamber 6 also contains, arranged centrally, a central tube 22 which is concentric with the central longitudinal axis A of the filter housing and which is provided at its lower end with an externally threaded fastening portion 24 which is screwed into the central bottom portion 20 of the housing 4. The delineating section of the fuel chamber 6 between the outside 26 of the central tube 22 and the inside 8 of the housing wall 10 constitutes the annular filter chamber of the liquid filter arrangement. Fuel which is to be cleaned in the filter arrangement 2 flows into the fuel chamber 6 via a tangentially directed fuel inlet 28 in the housing wall 10. In the central bottom portion 20 of the lower section 16 of the filter housing 4 there is an outlet 30 for tapping filtered fuel from the chamber 6.

The annular filter chamber between the outside 26 of the central tube 22 and the inside 8 of the housing wall 10 accommodates removably an interchangeable filter element 32 which in the direction of flow is situated between the fuel inlet 28 and the fuel outlet 30. As may be seen in FIG. 2, the sleevelike filter element 32 is arranged about the externally slightly upward-tapering central tube 22, this being a design which makes it easy for the filter element to be pushed onto the central tube.

The filter element 32 composed, for example, of stacked filter paper discs or folded filter paper material is provided at the bottom with an annular end piece 34 sealingly surrounding the central tube 22, and is provided at the top with a planar circular end disc 36 which is perpendicular to the central longitudinal axis A of the filter housing. The filter element 32 with its associated end piece 34 and end disc 36 constitutes a composite interchangeable filter cartridge. The filter element 32 is fastened to the underside of the lid 14 via the end disc 36. In the embodiment depicted in FIG. 2, the end disc 36 of the filter element 32 is fastened to the inside of the lid by means of a snap connection comprising elastically resilient locking catches 38 which protrude from the lid 14, and corresponding retaining catches 40 distributed in a circle on the concave inside 42 of the lid 14.

Figure 2:
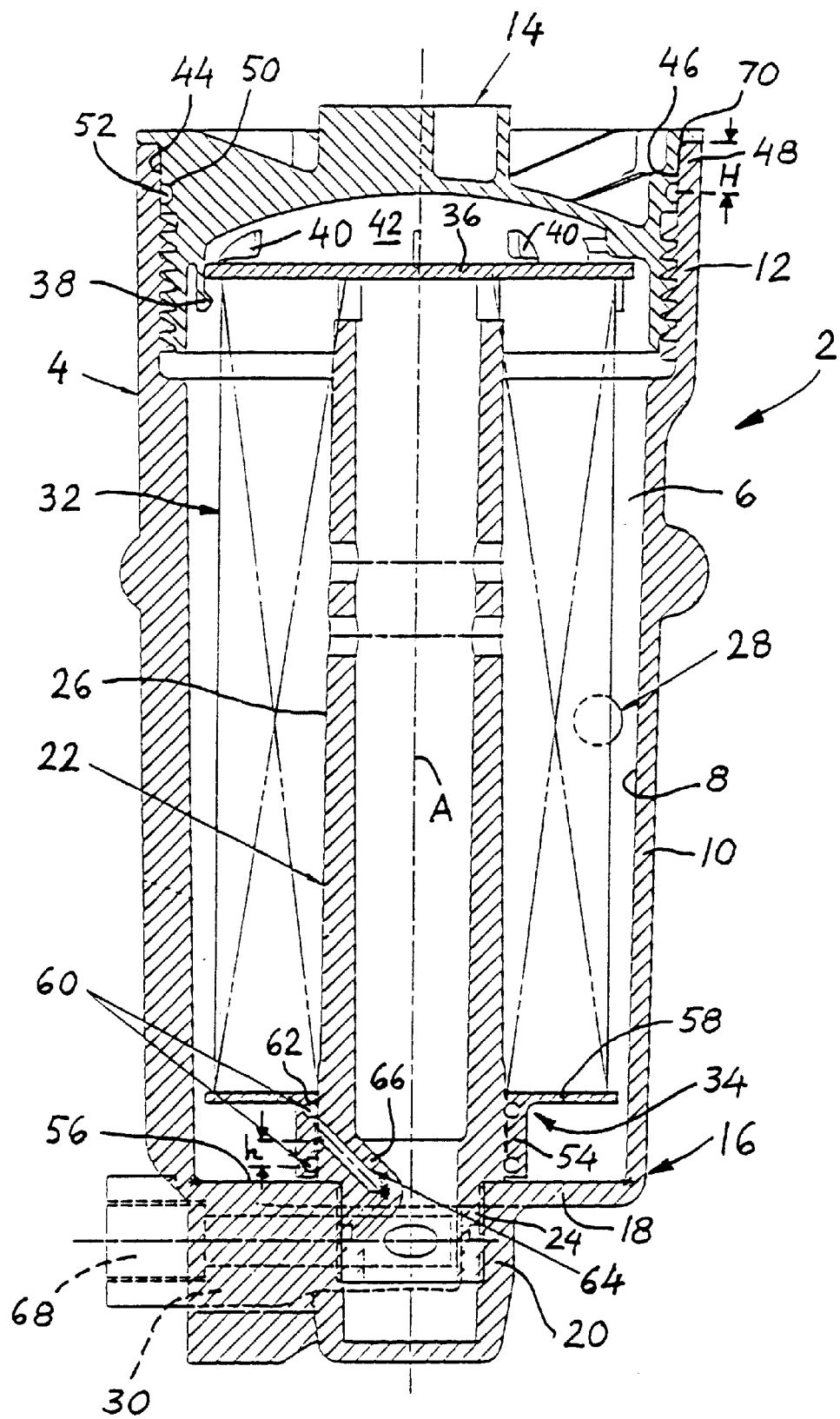
FIG. 2 depicts a diametrical axial longitudinal section through the liquid filter arrangement depicted in FIG. 1, along the section line II—II in FIG. 1.

As depicted in FIG. 2, the lid 14 fastened sealingly in the upper section 12 of the filter housing has a circularly cylindrical outer shell surface 44 which forms a sealing surface and cooperates with a corresponding annular sealing surface 46 on the inside of the annular end portion 48 of the filter housing 4. The shell surface 44 of the lid 44 acting as sealing surface is provided with a circumferential groove 50 in which is inserted a circumferential seal 52, preferably in the form of an O-ring. This sealing ring 52 abuts sealingly against the annular sealing surface 46 of the filter housing.

The end piece 34 at the lower end of the filter element 32 includes a sleeve portion 54 which sealingly surrounds the central tube 22 and which has its lower end surface situated quite close to the inside 56 of the bottom wall 18 of the housing. The upper end of the sleeve portion 54 has a disc-shaped flange portion 58 protruding radially from it in a plane perpendicular to the longitudinal axis A. On its inside facing towards the central tube 22, the sleeve portion 54 of the end piece 34 is provided with two axially separated annular seals 60 which surround and bear on the outside of the central tube. These two seals, preferably in the form of O-rings, are placed in a pair of parallel circumferential grooves 62 on the inside of the sleeve portion. When the filter element 32 is in its fitted position depicted in FIG. 2, which is the same as its intended operating position, the two annular seals 60 are situated on axially opposite sides of the orifice to the inlet end of a draining duct 64 which extends obliquely inwards in a thickened end portion 66 of the central tube 22. The inner lower end of the draining duct 64 is in communication with a draining outlet 68 from the chamber 6.

When the filter element 32 is in the fitted position depicted in FIG. 2, the end piece 34 thus blocks, by means of its two annular seals 60, the inlet to the draining duct 64. Achieving the intended draining effect on the occasion of disassembling the filter element 32 from the fuel chamber 6 requires the inlet to the draining duct 64 to be so placed relative to the end piece 34 and the seals 60, and relative to the lid 14, that when the filter element 32 is removed from the chamber 6 the inlet to the draining duct 64 is freed and opened before the sealing effect between the lid 14 and the sealing surface 46 on the inside of the upper end portion 48 of the filter housing ceases. This condition may for example be expressed as follows. Measured in the direction of the longitudinal axis of the filter housing 4, the axial distance h between, on the one hand, the seal 60 which is situated on the sleeve portion 54 of the end piece the closer to the end bottom surface 56 of the fuel chamber 6 and, on the other hand, the inlet orifice to the draining duct 64 has to be shorter than the distance H between, on the one hand, the seal 52 on the shell surface 44 of the lid 14 and, on the other hand, the axially outermost edge 70 of the corresponding sealing surface 46 on the inside of the upper end section 48 of the filter housing.

What is claimed is:

1. A liquid filter arrangement comprising an external filter housing with an interior surface defining a liquid chamber, a liquid inlet to the chamber, the chamber having a bottom end region, a liquid outlet from the chamber at the bottom end region, the housing having an upper end region terminating at an upper edge;

a filter element disposed in the liquid chamber between the inlet and the outlet for filtering liquid passing from the inlet through the filter element to the outlet;

a lid on the housing and extending into the upper end region of the filter housing, the lid being sealed in the upper end region of the filter housing; the filter element being detachably connected to the lid such that the filter element may be removed from the filter housing along with the lid;

a tube in the housing, the tube including a tube portion toward the bottom end region of the chamber, a draining duct extending through a radially outer cylindrical surface of the tube portion and the draining duct communicating through the tube portion into the liquid chamber and a draining outlet from the housing communicating with the draining duct;

the filter including an end piece disposed around the radially outer cylindrical surface of the tube portion to block the draining duct, the end piece being so shaped, of such length and so placed relative to an inlet to the draining duct that as the lid is removed with the filter element from the upper end region of the housing, the end piece moves off and opens the inlet to the draining duct for permitting liquid to drain out of the draining duct before the lid has been removed from the filter housing and before a sealing effect between the lid and the filter housing ceases.

2. The liquid filter arrangement of claim 1, wherein the filter housing has a bottom portion and the tube portion has a lower end fastened in the bottom portion of the filter housing, whereby the tube may remain stationary in the housing as the lid and the filter element are removed from the housing.

3. The liquid filter arrangement of claim 2, wherein the filter housing has a central longitudinal axis and the tube is concentric with the central longitudinal axis of the filter housing.

4. The liquid filter arrangement of claim 2, wherein the filter housing has a longitudinal axis which is directed substantially vertically, so that the draining outlet is at the bottom of the filter housing.

5. The liquid filter arrangement of claim 1, wherein the end piece of the filter element includes a sleeve that surrounds the tube portion.

6. The liquid filter arrangement of claim 5, wherein the sleeve has a lower end portion adjacent to the bottom end region of the housing, a disk shaped flange protruding radially from the sleeve and being part of the filter element and movable therewith as the lid is moved out of the filter housing.

7. The arrangement of claim 5, wherein the sleeve includes an inside facing the central tube, two axially separated annular seals between the inside of the sleeve and the radially outer cylindrical surface of the central tube.

8. The liquid filter arrangement of claim 7, wherein the seals comprise rings, and the arrangement further comprising circumferential grooves in the inside of the sleeve in which the rings are respectively placed.

9. The liquid filter arrangement of claim 7, wherein the annular seals are so positioned along the sleeve that when the filter element is in the filter housing, the annular seals are on axially opposite sides of the inlet to the draining duct.

10. The arrangement of claim 9, wherein the lid has an outer shell surface, the filter housing has a cooperating annular sealing surface on an internal portion of the upper end region of the housing and the outer shell surface and the annular sealing surface of the lid cooperating for sealing the lid in the filter housing;

a circumferential seal in the shell surface of the lid and the circumferential seal bearing sealingly on the sealing surface at the upper end region of the filter housing;

the annular seals of the sleeve are so placed that measured in the direction of a longitudinal axis of the filter housing, an axial distance h between the one of the seals on the sleeve which is closest to the bottom region of the chamber and the inlet to the draining duct is less than a distance H between the circumferential seal on the lid shell surface and the upper edge of the annular sealing surface on the upper end region of the filter housing.

11. The liquid filter of claim 7, wherein the lid has an outer shell surface, the filter housing has a cooperating annular sealing surface on an internal portion of the upper end region of the housing and the outer shell surface and the annular sealing surface of the lid cooperating for sealing the lid in the filter housing;

a circumferential seal in the shell surface of the lid and the circumferential seal bearing sealingly on the sealing surface at the upper end region of the filter housing;

the annular seals at the sleeve are so placed that measured in a longitudinal axis of the filter housing, an axial distance h between the one of the seals on the sleeve which is closest to the bottom region of the chamber and the inlet to the draining duct is less than a distance H between the circumferential seal on the lid shell surface and the upper edge of the annular sealing surface on the upper end region of the filter housing.

12. The liquid filter arrangement of claim 1, wherein the filter element includes an end disk by which the filter element is connected in the lid.

13. The liquid filter arrangement of claim 12, wherein the end disk of the filter element is a planar circular disk disposed in a plane perpendicular to a longitudinal axis of the tube.

14. The arrangement of claim 12, further comprising snap connection elements between the end disk of the filter element and the lid for retaining the filter element stationary relative to the lid and for permitting connection and disconnection of the end disk and the lid.

15. The liquid filter arrangement of claim 1, wherein the lid has an outer shell surface, the filter housing has a cooperating annular sealing surface on an internal portion of the upper end region of the housing and the outer shell surface and the annular sealing surface of the lid cooperating for sealing the lid in the filter housing.

16. The liquid filter arrangement of claim 15, further comprising a circumferential seal in the shell surface of the lid and the circumferential seal bearing sealingly on the sealing surface at the upper end region of the filter housing.

17. The liquid filter arrangement of claim 16, wherein the circumferential seal comprises an O-ring and a circumferential groove in the shell surface of the lid which receives the O-ring.

18. The liquid filter of claim 16, wherein the end piece of the filter element includes a sleeve that surrounds the tube partition;

the sleeve includes an inside facing the central tube with two axially separated annular seals between the inside of the sleeve and the outside of the central tube;

the annular seals at the sleeve are so placed that measured in a direction of a longitudinal axis of the filter housing, an axial distance h between the one of the seals on the sleeve which is closest to the bottom end region of the chamber and the inlet to the draining duct is less than a distance H between the circumferential seal on the lid shell surface and the upper edge of the annular sealing surface on the upper end region of the filter housing.

19. The liquid filter arrangement of claim 16, wherein the shell surface of the lid includes a threaded external portion and the upper region of the filter housing includes a correspondingly threaded internal portion such that the lid is screw threadedly tightened into the housing.

20. The liquid filter arrangement of claim 15, wherein the shell surface of the lid includes a threaded external portion and the upper region of the filter housing includes a correspondingly threaded internal portion such that the lid is screw threadedly tightened into the housing.

* * * * *